No. 892,096. PATENTED JUNE 30, 1908.
J. TAYLOR.
ROLLER BEARING.
APPLICATION FILED OCT. 12, 1906.
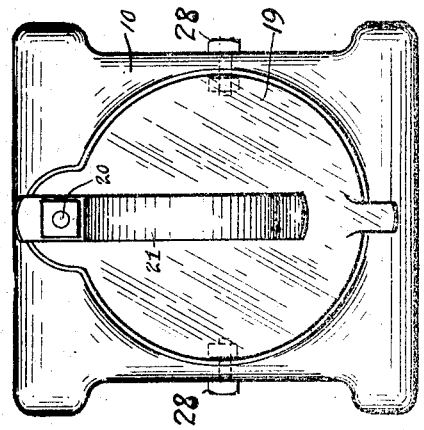
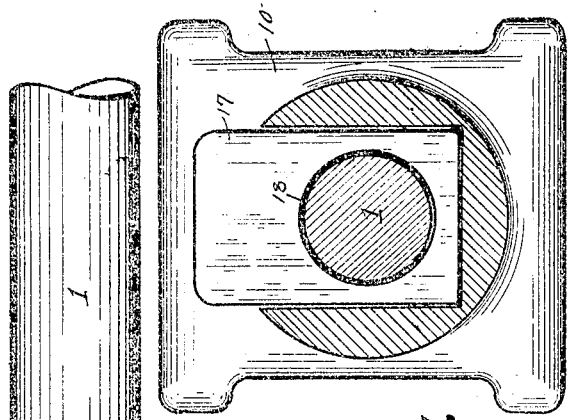
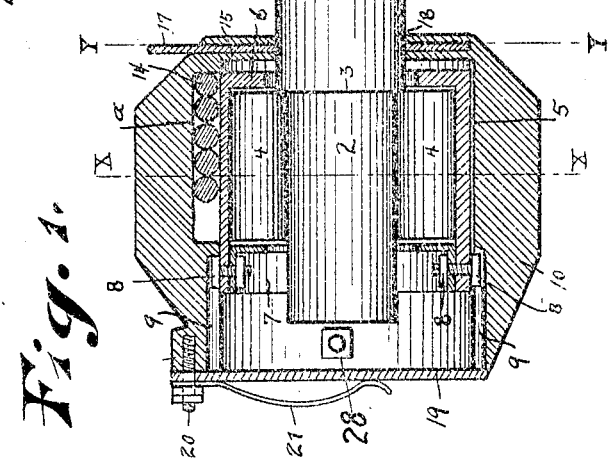
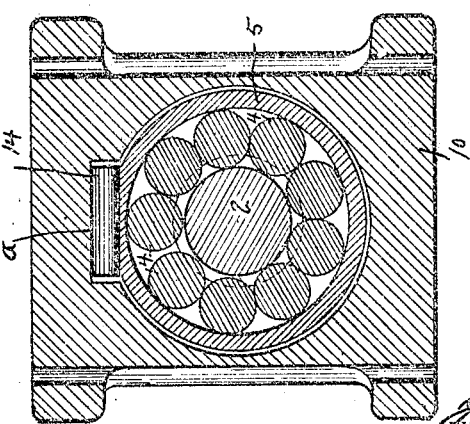
WITNESSES:
O. R. Erwin
M. M. Schulz
INVENTOR
Joseph Taylor
BY
Erwin & Wheeler
ATTORNEYS

UNITED STATES PATENT OFFICE.

JOSEPH TAYLOR, OF LUDINGTON, MICHIGAN.

ROLLER-BEARING.

No. 892,096.

Specification of Letters Patent.

Patented June 30, 1908.

Application filed October 12, 1906. Serial No. 338,651.

*To all whom it may concern:*

Be it known that I, JOSEPH TAYLOR, a citizen of the United States, residing at Ludington, county of Mason, and State of Michigan, have invented new and useful Improvements in Roller-Bearings, of which the following is a specification.

My invention relates to improvements in roller bearings.

The object of my invention is to provide a roller bearing for car axles which will run without oil, and in which the rollers will not wear flat, the rollers being free to shift in the box during an end thrust, so that the relative positions of the rollers to the axle is unchanged.

My invention also relates to certain improvements in the structure of the bearing, hereinafter described and claimed.

In the following description reference is had to the accompanying drawings in which, Figure 1 is a vertical sectional view, drawn on the axis of the axle shaft. Fig. 2 is a cross sectional view drawn on line x—x of Fig. 1. Fig. 3 is an end view. Fig. 4 is a sectional view on lines y—y of Fig. 1 showing the packing sheet.

Like parts are identified by the same reference characters throughout the several views.

The axle shaft 1 is provided with a reduced end portion 2 and with a shoulder 3 which abuts a set of rollers 4 carried by a cylindrical casing 5. The casing 5 has an inturned roller-retaining annular flange 6 at one end, with a central opening through which the axle shaft 1 extends, and at the other end a roller retaining angle iron ring 7 is secured to the interior surface of the casing by bolts 8, the heads of which engage in longitudinal channels 9 in the box 10, which incloses the end of the axle, roller casing, and rollers. The interior of the box is of a generally cylindrical form to correspond with the contour of the casing, but the upper outer surface of the casing is flattened and the box is provided with a rectangular recess a opposite this flat surface of the casing, which recess receives a series of rollers 14, adapted to support the load carried by the box.

The inner end of the box is provided with a wall 15 having a central aperture for the axle shaft and a slot or recess extends inwardly from the upper side to a point below this aperture and receives a sheet of packing 17, preferably formed of felt and having an aperture 18 for the shaft as shown in Fig. 4.

This packing excludes dust from the bearing. The outer end of the box is provided with a lid 19, connected with the upper portion of the box by a hinge bolt 20, which also supports an arched spring 21 in a position to bear against the central and lower portions of the lid and hold it tightly in closed position.

The load is supported from the shaft through the rollers 4, casing 5, rollers 14, and box 10. In case of an end thrust the friction of the axle on rollers 4 will retain these parts in their relative position while the loose rollers 14 permit the box and roller casing to shift relatively on longitudinal lines. With this construction the rollers 4 will not wear flat but will preserve a true cylindrical form. The shifting movement of the roller casing in the box is limited in one direction by the end wall 15 and in the other direction by bolts 28, but the axle shaft will normally hold the casing in an intermediate position. It will be observed that in the construction illustrated the axle shaft is without collars or projections of any kind except the shoulder 3. The similar journal at the other end of the axle prevents it from pulling out longitudinally. The heads of the bolts 8 in the channels 9 prevent the casing from shifting annularly in the box.

Having thus described my invention what I claim as new and desire to secure by Letters Patent is,

1. In a bearing of the described class the combination of an axle having a reduced end; a casing inclosing the end of the axle; rollers loosely interposed between the casing and the shoulder at the reduced end of the axle; a journal box loosely inclosing the casing and recessed on one side intermediate of its ends; and a set of loose rollers in said recess disposed transversely to the axle and supporting the box from the casing; said casing having a flat bearing surface for said rollers; together with a roller retaining flange in the outer ends of the casing, and bolts connecting the casing and flange, with the bolt heads projecting into longitudinal channels in the box.

2. In a bearing of the described class the combination of an axle having a reduced end; a casing inclosing the end of the axle; rollers loosely interposed between the casing and reduced end of the axle; a journal box loosely inclosing the casing and recessed on one side; and a set of loose rollers in said recess disposed transversely to the axle and supporting the box from the casing; said casing having a flat bearing surface for said rollers, the inner end of said box being apertured for the reception of the shaft back of the reduced end portion and slotted transversely for the reception of a correspondingly apertured sheet of packing.

3. In a bearing of the described class, the combination of an axle having a reduced end portion with an abrupt shoulder at the inner end of said portion, a casing inclosing the end of the axle and provided with an inturned flange at its inner end, an angle iron ring secured at the outer end of the casing, loose rollers interposed between the ring and shoulder, a journal box loosely inclosing the casing and recessed on one side intermediate its ends, a set of loose rollers in said recess disposed transversely to the axle and supporting the box from the casing, bolts extending through the outer end of the casing and serving as guides, and bolts extending through the outer end portion of the journal box in a position to serve as stops limiting the movement of the casing,—said casing having a flat bearing surface for the transversely disposed rollers and said journal box being provided with slots for the reception of the heads of the casing guide bolts, whereby the casing is held against rotation.

4. In a bearing of the described class the combination of an axle having a reduced end; a casing inclosing the end of the axle; rollers loosely interposed between the casing and reduced end of the axle; a journal box loosely inclosing the casing and recessed on one side intermediate of its ends; and a set of loose rollers in said recess disposed transversely to the axle and supporting the box from the casing; said casing having a flat bearing surface for said rollers, said casing having inturned roller retaining flanges at its respective ends, and said box being provided with means for limiting the longitudinal movement of the casing therein.

In testimony whereof I affix my signature in the presence of two witnesses.

JOSEPH TAYLOR.

Witnesses:
 NAZARY CARTO,
 ROBERT ARNOTT.